C. T. ELDREDGE.
MOTOR TRUCK.
APPLICATION FILED APR. 17, 1915.
1,165,161.
Patented Dec. 21, 1915.
3 SHEETS—SHEET 1.
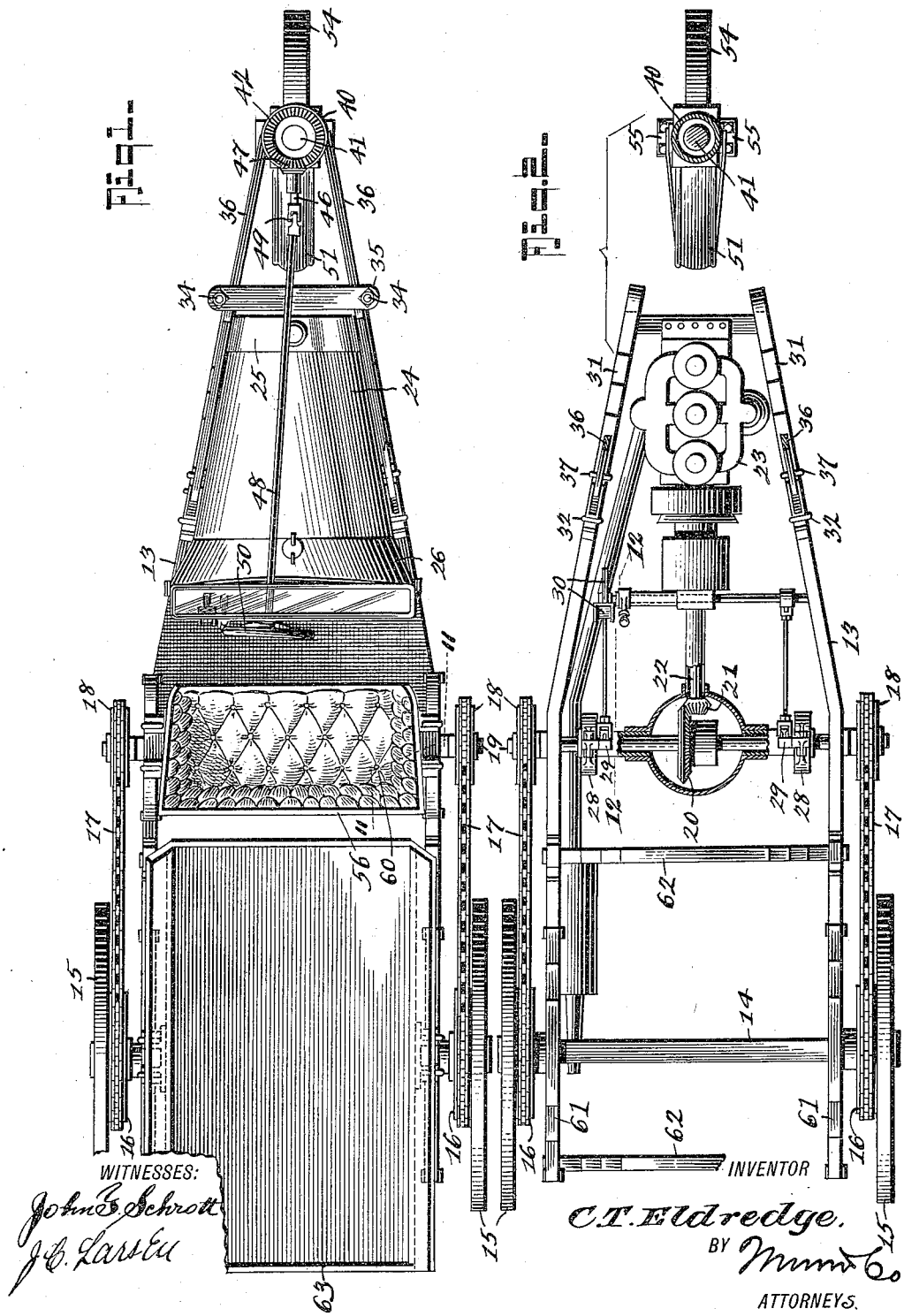
WITNESSES:
John B Schrott
J. C. Larsen
INVENTOR
C. T. Eldredge.
BY Munn & Co.
ATTORNEYS.

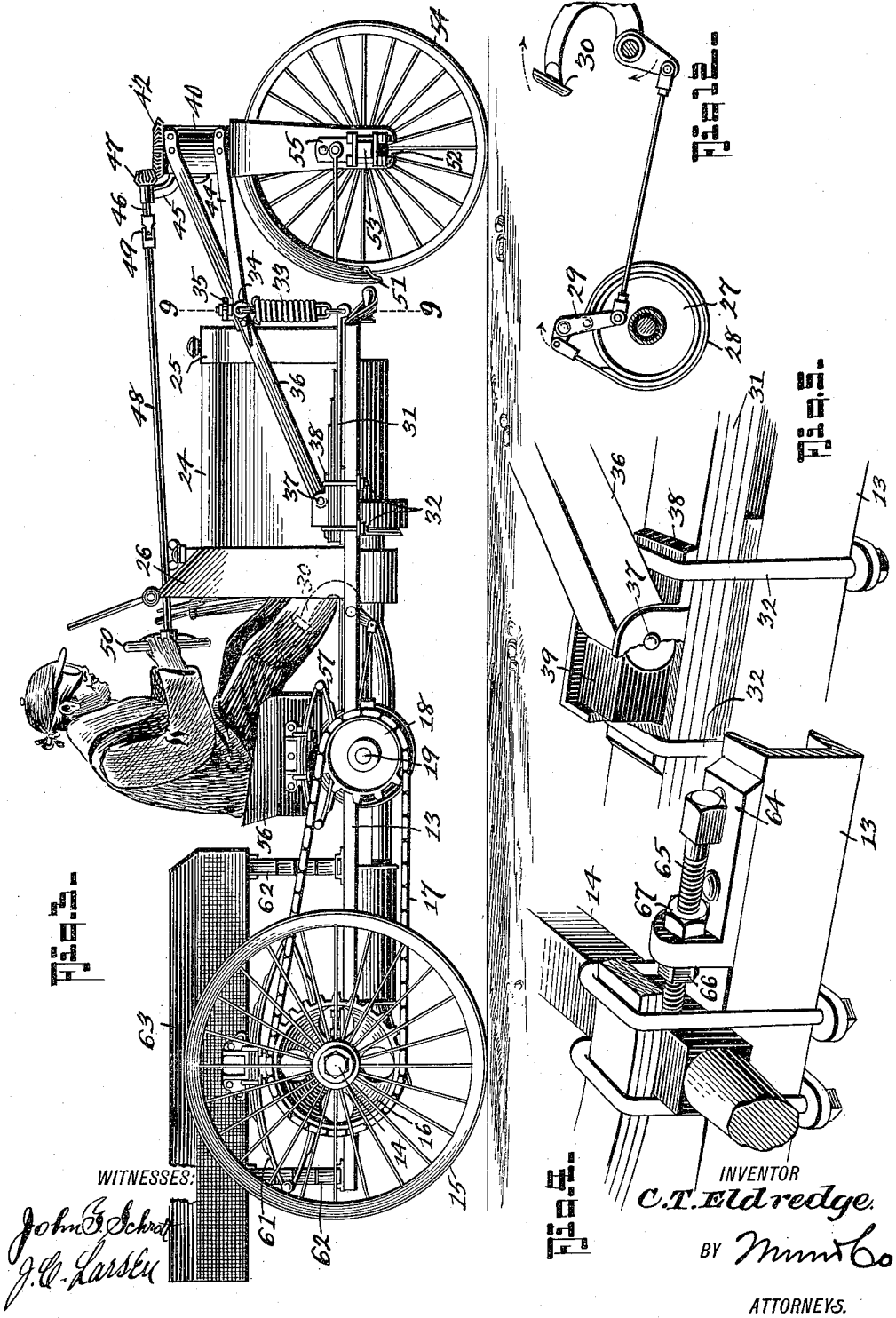

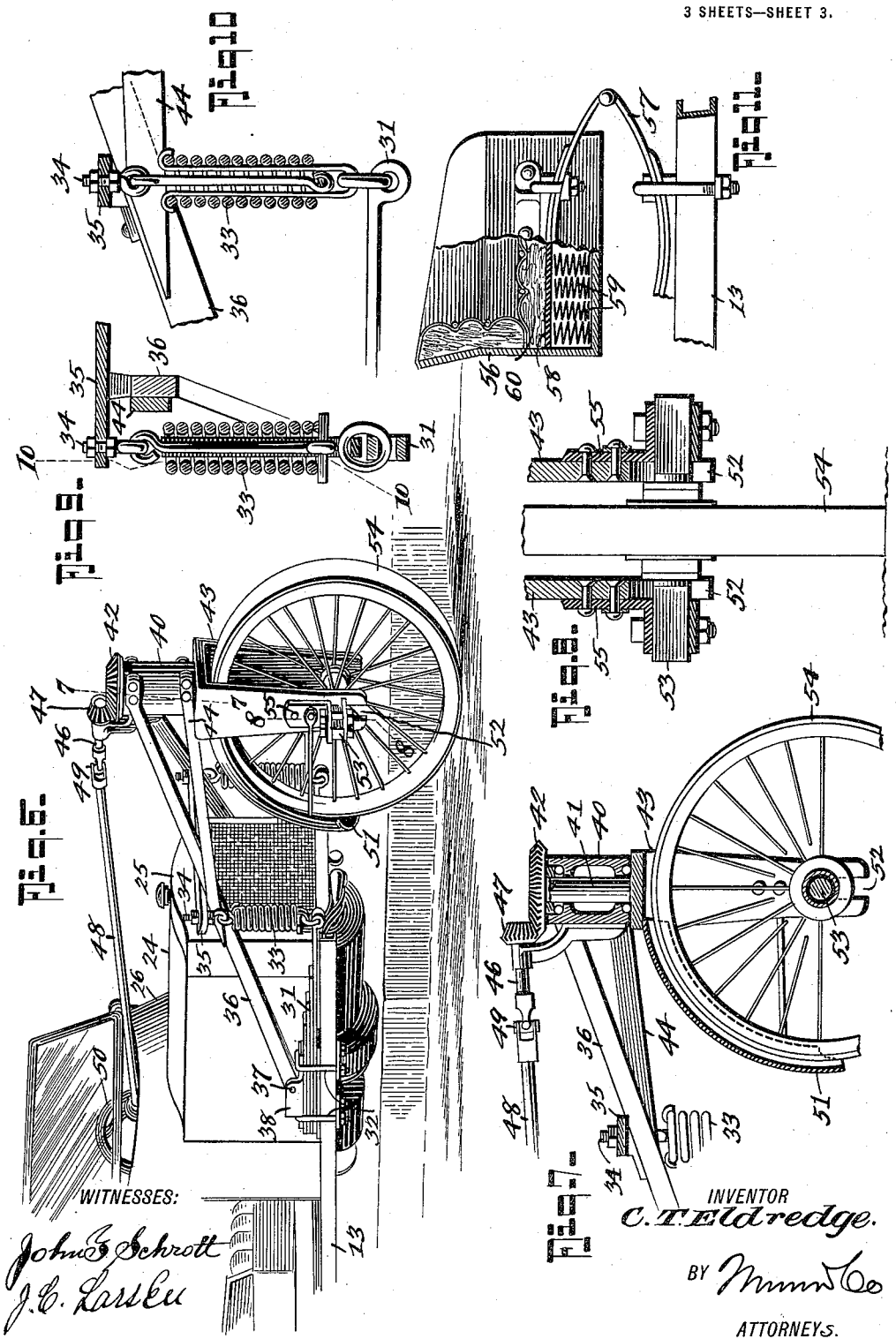

UNITED STATES PATENT OFFICE.

CLYDE T. ELDREDGE, OF MOUNTAIN RANCH, CALIFORNIA.

MOTOR-TRUCK.

1,165,161.  Specification of Letters Patent.  Patented Dec. 21, 1915.

Application filed April 17, 1915. Serial No. 22,015.

*To all whom it may concern:*

Be it known that I, CLYDE T. ELDREDGE, a citizen of the United States, and a resident of Mountain Ranch, in the county of Calaveras and State of California, have invented certain new and useful Improvements in Motor-Trucks, of which the following is a specification.

My invention relates to motor vehicles, with especial reference to business trucks, and one of the main objects thereof is to supplant the conventional front wheels by one wheel so arranged as to be capable of a relatively great degree of vertical movement with respect to the frame, whereby the jolting now common in such vehicles is very materially lessened, thus resulting in easier riding qualities, less destructive effect on the motor and freight, permits the use of metal tires with the consequent saving, prevents torsional strains on the frame, reduces the weight and cost of construction and upkeep, and materially lengthens the life of the vehicle, and a further advantage lies in the fact that I may use larger wheels with metal tires which adapt the vehicle to rough, mountainous, and stony roads.

A further advantage lies in the fact that I locate the delicate engine at a point farthest removed from the axles and thus practically eliminate any effect thereon of road conditions.

A further advantage is that the major part of a load is carried by the rear wheels, thus resulting in better traction and insuring increased speed of the vehicle, as well as power. A further advantage lies in the fact that I can make a much shorter turn than is possible with four wheeled vehicles as now constructed.

My invention is fully described in the following specification, of which the accompanying drawings form a part, in which like reference characters are used to designate like parts in each of the views, and in which:—

Figure 1 is a plan view of a motor truck constructed in accordance with my invention; Fig. 2 is a similar view of the motor truck chassis, parts being in section to show details; Fig. 3 is a side elevation of the motor truck; Fig. 4 is a fragmentary, perspective, view of the rear axle mount; Fig. 5 is a similar view of the manner of pivotally mounting the front wheel supporting frame; Fig. 6 is a fragmentary, perspective, view of the front of the motor truck; Fig. 7 is a section taken approximately on the line 7—7 of Fig. 6; Fig. 8 is an enlarged section taken on the line 8—8 of Fig. 6; Fig. 9 is an enlarged section taken on the line 9—9 of Fig. 3; Fig. 10 is a section taken on the line 10—10 of Fig. 9; Fig. 11 is a section taken on the line 11—11 of Fig. 1; and Fig. 12 is a section taken on the line 12—12 of Fig. 2.

In the drawings forming a part of this application I have shown a present preferred embodiment of my invention, comprising a frame 13 supported at the rear thereof by an axle 14 having wheels 15 revoluble thereon provided with sprocket-wheels 16 enmeshed with endless chains 17 in turn engaged by sprocket-wheels 18 carried by a shaft 19 having a bevel-gear 20 thereon enmeshed with a bevel-pinion 21 on the drive-shaft 22 of the engine 23, said engine being covered by a bonnet 24, and said frame carrying a radiator 25 and a dash-cowl 26; as shown in Figs. 2 and 12, the shaft 19 is provided with brake-drums 27 adapted to be frictionally engaged by brake-bands 28 actuated by levers 29, and pedal 30 of any desired form.

The forward ends of the beams of the frame 13 have, each, a leaf spring 31 secured thereto by means of bolts 32, said springs being projected forwardly of said frame beams and in operative connection with coil springs 33 also in operative connection with adjustable eye-bolts 34 carried in a transverse bar 35.

The bar 35, adjacent its ends, rests upon two beams 36 pivoted, each, at the rear end, by means of a bolt 37 carried by a socketed plate 38 held by the bolts 32, a rubber or other cushion 39 being provided to serve as an anti-rattler, and it will be seen that the beams 36 are movable in a vertical plane, each, this construction being shown in detail in Fig. 5. The beams 36 are upwardly and forwardly inclined and are secured to the front wheel head 40 in which is antifrictionally mounted the vertical shaft 41 having a bevel gear 42 at the top thereof and the usual fork 43 at the bottom thereof as now used upon bicycles, and I also employ brace rods 44 between the beams 36 and the head 40.

Secured to the rear side of the head 40 is a bracket 45 which carries a bearing for a shaft 46 carrying a bevel pinion 47 enmeshed with the bevel gear 42, said shaft 46 being connected with the steering-rod 48 by means of a universal joint 49 and which rod is provided with a steering-wheel 50.

The fork 43 carries a fender 51 and both arms thereof are vertically slotted at their lower ends as shown at 52 to receive the ends of the front axle 53 having a wheel 54 thereon, said axle ends being held in keepers 55 secured to the respective arms of the fork 43.

By means of this construction it will be seen that the front wheel may move vertically for a considerable distance with respect to the frame 13 and without any effect on the latter, because of the leaf springs 31 and the coil-springs 33, thereby resulting in easy riding of the frame 13, and it will be noted that the engine is mounted at a point far removed from the front wheel 54, thus preventing any injurious effect thereon even on very rough roads.

The seat 56 is carried by full elliptical springs 57 and is provided with a board 58 therein carried upon the upper ends of helical springs 59 and which board serves as a support for the cushion 60.

The rear portion of the frame 13 carries two longitudinally arranged elliptic springs 61 and two transverse elliptic springs 62 for a box 63 adapted to receive the load or freight, but it will be noted by reference to Fig. 4 that the springs 61 are not mounted directly upon the frame beams but upon the axle 14, thus relieving the frame of the strain of the load and imposing the same on the axle.

Because of the single front wheel, the torsion common upon the frames of four-wheeled vehicles is avoided, and the elimination of one wheel, the fender therefor, and the greater part of the conventional front axle, results in a lighter vehicle without any sacrifice of strength, in a corresponding economy of manufacture, and in the saving of fuel and lubricant, and at the same time insuring longer life to the vehicle and engine because of the practical elimination of jolting, and enabling the turning of the vehicle in about its own length.

As shown in Fig. 4, I provide a support 64 on each beam of the frame for a threaded bolt 65 bearing upon the corresponding end of the axle and locked by means of nuts 66 and 67, these bolts serving as tensioning means for the endless chains 17 and thereby preventing the rattling thereof.

My motor truck is highly efficient and is well adapted for mountainous or country roads and for light and rapid hauling where horses are too slow and rubber tired vehicles are too expensive in maintenance, my wheels being, as stated, adapted for metal tires without any sacrifice to the easy riding qualities of the vehicle.

My motor truck is light and comparatively inexpensive and, while I have shown a present preferred form of construction thereof, it will be understood that I do not limit myself thereto, but may make changes thereover, within the scope of the following claims, without departing from the spirit of the invention or sacrificing its advantages.

Having fully described my invention, what I claim as new, and desire to secure by Letters Patent, is:—

1. In a motor vehicle, a frame, two wheels supporting the rear end thereof, two forwardly directed arms in pivotal connection therewith adjacent the front end thereof, a head carried by said arms, a front wheel journaled in said head, a leaf spring on each side of said frame, at the front end thereof, a coil spring connecting said leaf springs with the respective arms, and a steering-rod in operative connection with said front wheel.

2. In a motor vehicle, a frame, two wheels supporting the rear thereof, a leaf spring on each side of the forward end thereof, a socketed plate over said leaf spring on each side of said frame, bolts locking said frame, leaf springs, and plates together, a pivot carried by each plate, a forwardly directed beam pivotally mounted on each bolt, a head carried by said beams, a wheel journaled in said head, a steering-rod in operative connection with said wheel, and a coil spring joining the respective leaf springs and beams.

In testimony whereof I have signed my name to this specification in the presence of two subscribing witnesses.

CLYDE T. ELDREDGE.

Witnesses:
CHARLES F. BOSSE,
LOUIE ARMSTRONG.